Oct. 4, 1938.　　　　　L. M. PAYNE　　　　　2,132,045
AUTOMOBILE BODY HEATER
Filed Feb. 27, 1937　　　2 Sheets-Sheet 1
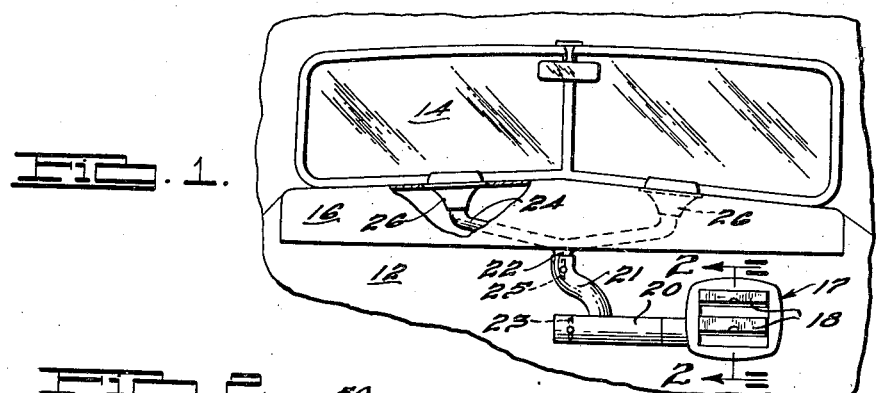
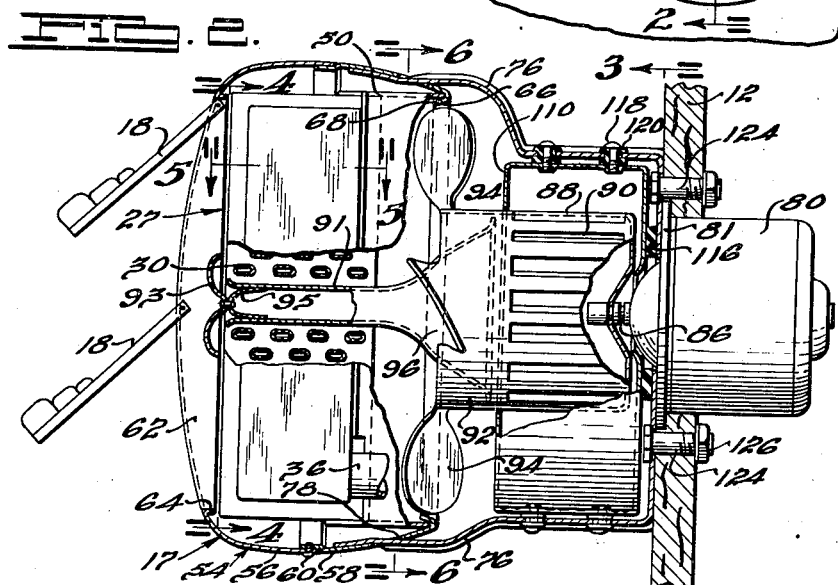
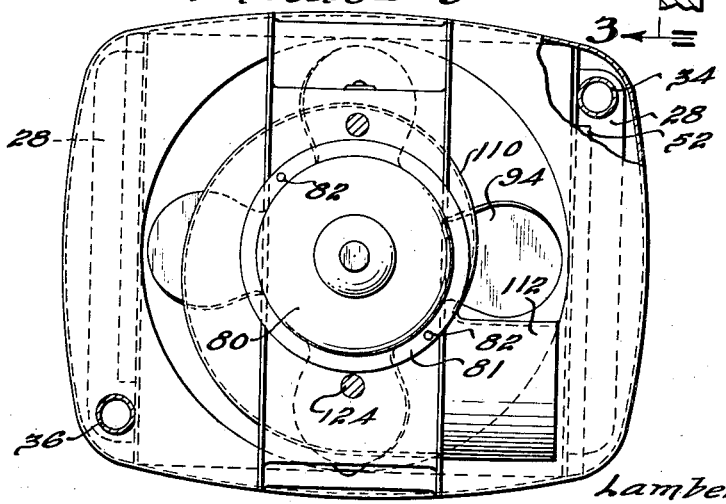
INVENTOR
Lambert M. Payne
BY
Harness, Dickey & Pierce
ATTORNEYS.

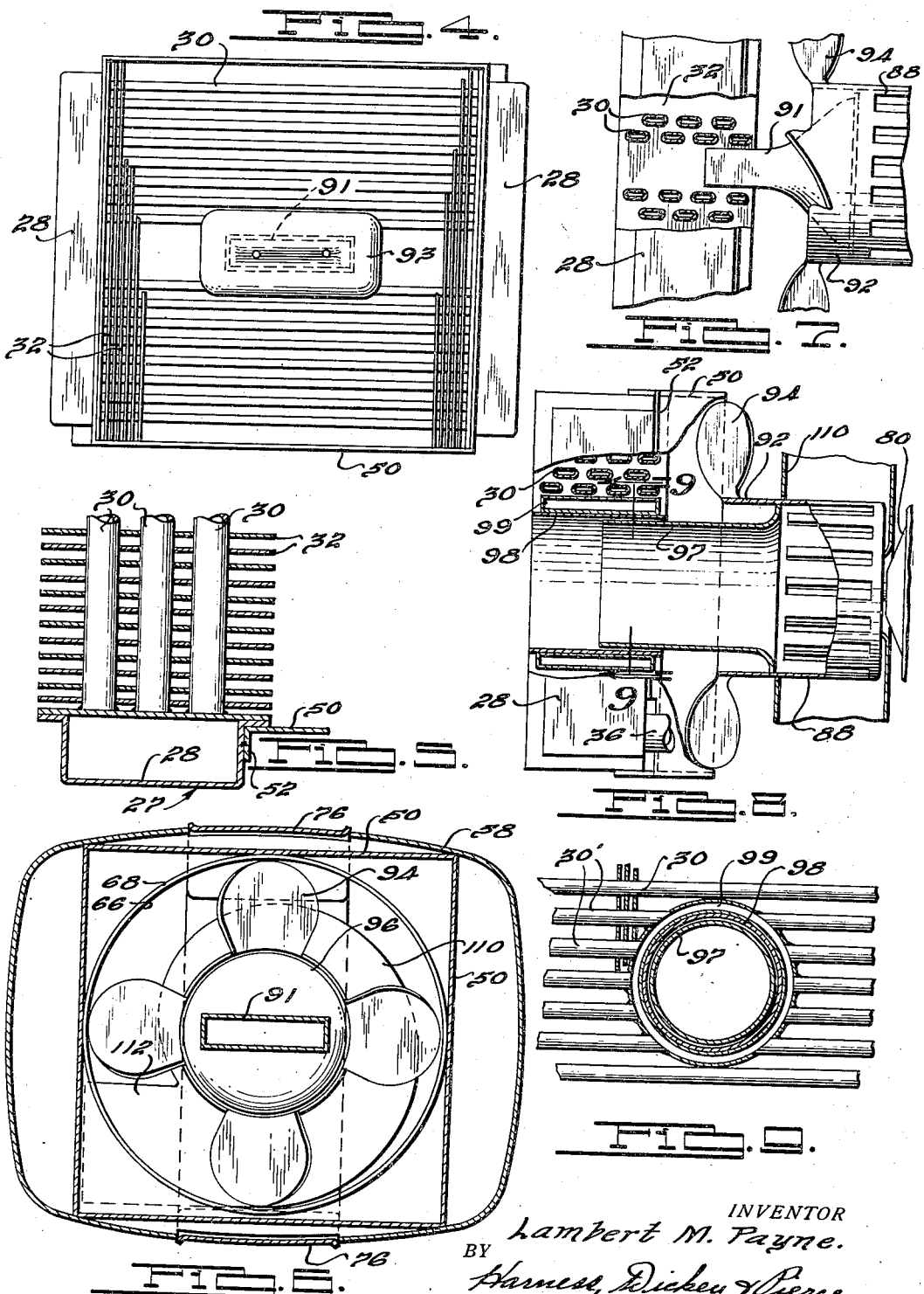

Patented Oct. 4, 1938

2,132,045

UNITED STATES PATENT OFFICE 2,132,045

AUTOMOBILE BODY HEATER

Lambert M. Payne, Detroit, Mich.

Application February 27, 1937, Serial No. 128,078

8 Claims. (Cl. 257—137)

The present invention relates to automobile body heaters and particularly relates to the type of heater by which the temperature of the air within the body may be raised and the windshield prevented from frosting by directing a portion of the heated air thereagainst.

Objects of the present invention are to provide a relatively small and compact heater of increased heat efficiency as compared with prior constructions; to provide a heater structure which utilizes the entirely forwardly facing area of the heater to obtain increased heating efficiency; to provide a compact heater unit which may be conveniently mounted to the vehicle dash board and take up a minimum of space within the passenger compartment; and to provide a heater structure which is economical to manufacture, easy to install, and effective in use.

Other objects of the present invention will become apparent from the following specification, the drawings relating thereto, and from the claims hereinafter set forth.

In the drawings in which like numerals are used to designate like parts in the several views throughout:

Figure 1 is a fragmentary elevational view, with parts broken away, of the interior of a vehicle having associated therewith a heating unit embodying features of the present invention;

Fig. 2 is a partial cross sectional view with parts broken away and showing parts in elevation, taken substantially along the line 2—2 of Fig. 1;

Fig. 3 is a rear elevational view with parts broken away showing parts in cross section and showing the motor in elevation taken substantially along the line 3—3 of Fig. 2;

Fig. 4 is a partial, front elevational view, taken substantially along the line 4—4 of Fig. 2;

Fig. 5 is a partial cross-sectional view taken substantially along the line 5—5 of Fig. 2;

Fig. 6 is a cross sectional view showing parts in elevation taken substantially along the line 6—6 of Fig. 2;

Fig. 7 is a fragmentary, vertical cross-sectional view of a modification of certain details of the present invention;

Fig. 8 is a view similar to Fig. 2 but with parts broken away and removed, illustrating a modification of the present invention; and Fig. 9 is a partial vertical cross sectional view, showing parts in elevation, taken substantially along the line 9—9 of Fig. 8.

In prior heater structures in which the heated air is discharged from the heater through a forwardly facing opening by means of a propeller fan mounted behind the opening, it has been found that most of the air discharged from the heater is confined to those portions of the heater adjacent the periphery or outer edge portions of the front face, leaving within the center portion of the front face a substantially dead space, so far as the presence of heated air is concerned. According to the present invention, this substantially dead center portion of the front face, or of the core adjacent the front face, is utilized to increase the efficiency of the heater.

In general, according to the present invention, a substantially vertical forwardly facing heating core is provided having mounted therebehind a unitary propeller and centrifugal fan member. An air confining conduit extends through the core from a position adjacent the front thereof rearwardly to a position adjacent the inlet of the centrifugal fan. This conduit is preferably located adjacent the center portion of the core thus utilizing what has previously been a dead space in a manner that will become more apparent from the following description. As the fan unit rotates, air is forced through the heating core, thereby heating the air, and a portion of this heated air is reversed in its flow and directed into and through the conduit to the inlet end of the centrifugal fan. This air is then discharged from the centrifugal fan through a conduit either directly into the passenger compartment or carried by a conduit to positions immediately behind the front windshield and directed thereagainst for preventing frosting of the windshield. According to the present invention valves are provided in these conduits which may be regulated so that none of the air is discharged through these conduits, or regulated to direct all of the air to one or the other of the conduits, or regulated to direct a portion of the air to each of the conduits. The main portion of the air passing through the core passes directly through the forwardly facing front wall of the heater into the passenger compartment.

Further, in automobile body heaters of the type including a radiator heated by steam or hot water and a motor driven fan which circulates air in the body through the radiator for the purpose of heating the same it has become increasingly popular in recent years to provide means for directing a portion of the air heated from the radiator against the rear face of the automobile windshield, or against the feet of the driver, independently of the main stream of air issuing from the heater. Such separate stream of air is directed against the inner face of the windshield in order to remove any condensed moisture in the form of fog or the like that tends to collect on the same and is directed towards the feet of the driver in order to keep his feet warm and to offset the discomfort of any leakage of cold air up through the pedal or other openings which may be found in the floor boards.

One popular way of accomplishing this result is to project the end of a tube over the front face of the heater and the opposite end of the tube adjacent the windshield so that a part of the heated air issuing from the face of the heater will be blow into contact with the inner face of the windshield. In some installations a motor driven fan is inserted in this tube in order to increase the volume of air flowing through it to the windshield. Such types of devices are not meeting with great favor for the reason that they materially reduce the main stream of air flowing from the heater and are necessarily of a more or less accessory proposition which creates an impression that the device is something that is added to the heater as an afterthought.

In the more popular types of devices an auxiliary fan is built into the heater proper and discharges an independent stream of heated air through a tube to the windshield or other point at which it is desired to discharge it. These devices being of a built-in nature are more favored and are usually more efficient. These later types of devices as heretofore designed, as far as I am aware, are not as highly efficient as desired and additionally have been embodied in a necessarily bulky structure interfering with the leg room in the front or driver's compartment of an automobile, necessarily reduce the efficiency of the main heater to a considerable extent, and do not provide the desired volume of flow in the auxiliary air stream. One reason for this is that in at least one of the types of built-in devices heretofore offered for sale the auxiliary fan is positioned in the rear of the motor which drives the main fan as well as the auxiliary fan and this necessitates that the air for the auxiliary fan must be drawn over the motor in passing from the radiator to the auxiliary fan, making a relatively long and tortuous path for the auxiliary air to flow through and unless the conduits for the auxiliary air flowing from the radiator to the auxiliary fan are exceptionally small it increases the bulk of the device and particularly its transverse dimensions to an undesirable extent. For this reason the resulting structure is such as to make it necessary to cut a hole through the automobile dash of a size commensurate with substantially the maximum external dimensions of the heater where it is desired to project a portion of the heater through the dash into the engine compartment in order to increase the leg room in the driver's compartment.

In accordance with the present invention a built in type of automobile body heater provided with a built in auxiliary fan is provided which decreases the efficiency of the heater for heating the main body of air in the automobile very little, if any, over a correspondingly sized heater of conventional construction without the auxiliary fan feature and at the same time is so constructed and arranged as to provide an auxiliary air stream of greatly increased volume as compared to heretofore designed construction. This is accomplished by reversing the direction of flow of a portion of the air forced forwardly through the heating core and drawing such air through an air confining conduit at the central portion of the radiator or its core.

Furthermore in accordance with the present disclosure the auxiliary fan instead of being provided in the rear of the motor driving the main fan is provided between the motor and the radiator and between the main fan and the motor and is provided with a co-operating casing which, of course, is in the rear of the main fan and accordingly does not interfere with the proper free flow of air to the main fan. The auxiliary fan is preferably of the centrifugal type and a duct is provided through the central portion of the radiator core to provide for a proper flow and volume of air to the auxiliary fan which discharges the air from the casing to the desired point of distribution. By placing the auxiliary fan in advance of the motor the rear end of the heater assembly may be made relatively small and so as to permit at least the motor portion of the assembly to be projected through the co-operating dash and into the engine compartment of the automobile without requiring an opening of substantially greater size than the motor itself. Furthermore, and particularly where the auxiliary fan is of the centrifugal type under which circumstances it may be made relatively small in diameter, that portion of the assembly including the auxiliary fan and its casing may also be projected through the dash of the automobile and still without cutting an opening in the dash of a size commensurate with the maximum external dimensions of the heater assembly as has been necessary in heretofore designed structures.

Referring now to the accompanying drawings, in Fig. 1 is shown an automobile having a dash 12, a windshield 14, shown as of the divided type, and an instrument panel 16. The heater assembly is shown generally at 17 it being understood that it is supported from the dash 12 and that the main flow of heated air therefrom is discharged through its front face, past the usual shutters 18. The auxiliary air stream from the heater 16 is shown by way of illustration as being discharged through a tube 20 having communicating therewith a flexible tube 21 which is connected to a Y 22 from which the branches 24 lead to nozzle-like members 26 which project through openings therefor in the upper edge of the instrument panel 16 and in a position to direct the heated air therefrom against the inner face of the windshield 14 on opposite sides of the center thereof. The conduit 20 is provided with a discharge opening adjacent to which a valve 23 is mounted within the conduit 20. By opening the valve 23 warm air may be directed into the passenger compartment toward the driver's feet. A valve 25 is mounted within the conduit 21 which when open permits passage of the warm air to the branches 24. Both of these valves may be closed so that all of the heated air is discharged through the shutters 18.

Referring now to Figs. 2 to 6, inclusive the heat exchanger or radiator element per se includes a pair of spaced headers and interconnected passages for the flow of heating medium between them. This heating medium may, of course, be any suitable substance but preferably in accordance with conventional constructions is either heated water from the internal combustion engine which drives the cooperating automobile or steam which is formed as a result of the operation of the engine. The headers may be arranged either at the top and bottom or at the side and the interconnecting passages may be either tubes of either round or flat section or of that type of construction commonly known as honeycomb. As a matter of illustration the particular radiator shown comprises transversely spaced headers 28 one arranged at each side of the heater and interconnected tubes 30 shown of the flattened type with the plane of thickness of the tube arranged in parallel relation to the axis of the heater. The tubes 30 are preferably arranged in staggered relation as illustrated best in Fig. 2. Preferably the tubes 30 carry a plurality of spaced heat exchange fins 32 thereon in accordance with conventional practice. Heating medium is introduced into one of the headers 28 through a rearwardly extending tube 34 connected into one of the headers 28 adjacent one end thereof and is discharged from the opposite end of the opposite heater through a similar tube 36, it being understood that the tubes 34 and 36 project forwardly through the dash 12 of the automobile and are there connected with a suitable source of heating medium and in such a manner as to cause a circulation of heating medium through the radiator 27.

The radiator 27 is supported in a frame-like element 50. The frame element 50 illustrated is of rectangular shape, formed from flat sheet metal and is of such vertical dimensions that the upper and lower edges of the radiator 27 are snugly received between the forward edges thereof. Because of the header 28 at the sides of the radiator 27 the forward marginal portions of the side members of the frame element 50, which are also horizontally spaced to snugly receive the corresponding sides of the radiator 27 between them, are bent upwardly as at 52 to form flanges which abut against the rear face of the corresponding header 28 and thus serve to limit rearward movement of the radiator 27 rearwardly with respect to the frame 50. The flanges 52 are each cut away at one end to provide for passage of the corresponding tube 34 or 36 therethrough.

The heater assembly is provided with an ornamental casing portion indicated generally at 54 which encloses the radiator 27 and forms a shroud for the main fan which will hereinafter be described. This casing 54 is formed in two parts, namely 56 and 58, as best illustrated in Fig. 2, which parts are provided with telescopically engaging marginal edge portions removably secured together by means of screws 60. The front casing portion 56 is provided with a central rectangular opening 62 through which the air heated by the radiator 27 is discharged, the metal of the casing 56 surrounding the opening 62 being inwardly turned as at 64 into abutting relation with respect to the marginal edge portions of the forward face of the radiator 27. The doors 18 may be suitably hinged to the flange portion 64 so as to enable the effective area of the opening 62 to be controlled and to aid in the directional distribution of the main stream of air issuing from the radiator 27.

The rear casing part 58 extends into rearwardly spaced relation with respect to the rear face of the radiator 27 and its rear face is formed to provide a circular opening 66 therein, the metal around such opening being forwardly bent as at 68 to hook over the rear edge of the frame 50 at the center of each side and at the top and bottom thereof. The radiator 27 and frame 50 are thus clamped in assembled relationship between the rear edge of the marginal flange 64 at the forward edge of the casing part 56 and which flange abuts against the forward face of the radiator 27 and the rear wall of the rear casing half 58 against which the rear edge of the frame member 50 abuts, the flanges 52 on the frame member 50 in abutting against the headers 28 preventing further telescoping effect between the radiator 27 and the frame member 50.

In order to support the heater assembly from the dash 12 and to support the fans and driving motor with respect to the radiator 27 a strap member 76 is provided. The strap member 76 is of more or less U-shaped formation with the forward edges thereof projecting through suitable openings 78 formed at diametrically opposite points in the rear casing part 58 and into contacting relationship with respect to the interior face thereof to which such ends are preferably rigidly secured as by spot-welding or the like. The strap 76, of course, extends rearwardly from the casing half 58 and the driving motor 80, which is preferably of the electric type, is secured to the bottom of the U thereof by means of screws or bolts 82, which extend through openings in an integral annular flange 81 formed adjacent the front face of the motor 80 and extending radially outwardly beyond the periphery of the motor. A pad of rubber may be interposed between the strap and the motor so as to lessen the transmission vibration from one to the other.

The motor 80 is provided with a driving shaft 86 to which a fan assembly is supported and drivingly secured. The fan assembly comprises in part a conventional type of centrifugal fan 88 having impeller blades 90 struck out from the peripheral portions thereof also forming openings therethrough as in conventional constructions, but in accordance with the present invention the centrifugal fan portion 88 is provided with a forwardly extending portion 92 at its open end and in which portion no blades, such as the blades 90, or corresponding openings are provided and which serves at least partially as the inlet duct for the flow of air to the centrifugal fan 88.

A plurality of axial type of fan blades 94 are formed at the forward edge of the extension 92 which is substantially mid-way between the forward edge of the centrifugal fan portion 88 and the rear face of the radiator 27.

In order to provide an air confining conduit for returning the air through the core in the direction opposite to that of the air forced outwardly through the front face of the heater, a hollow member 91 is fixedly secured relative to the heating core, as by soldering to the fins or tubes, and is preferably located substantially centrally thereof. The member 91 is preferably substantially rectangular in cross section, as best indicated in Fig. 4, in that portion of the member extending within the core, and preferably extends from a position adjacent the front face of the core rearwardly through the core. In order to provide space for that portion of the member 91 within the core those transverse tubes 30 at substantially the center of the core are dispensed with so as to provide space for the reception of the member 91. By having the member 91 substantially rectangular in cross section and therefore provided with substantially flat top and bottom walls a minimum number of the central tubes 30 need be dispensed with to provide the space for the member 91. The fin members 32 extend across the space in the core caused by the absence of the central tubes 30, and that portion of the core adjacent these spaces is thereby provided with heat by the radiating fins.

An elongated deflector member 93 is mounted within the inlet opening adjacent the front of the conduit member 91, and is so shaped that it extends forwardly beyond the front face of the core and also extends above the upper wall of the member 91 and below the bottom wall of the member 91 so that a portion of the air passing through the core is deflected by the member 93 and directed into the channel formed by the member 91. Means in the form of a U-shaped spring clip 95 is secured to the deflector member 93 and is received within the channel member 91 and resiliently bears against the walls thereof to retain the deflector 93 in assembled position.

That portion of the conduit member 91 indicated at 96 which extends rearwardly beyond the rear face of the heating core is flared outwardly and is preferably circular in cross section and extends within the extension 92 of the fan unit so that the air passing through the conduit formed by the member 91 is confined and directed into the inlet of the centrifugal fan 88.

A conventional form of centrifugal fan housing 110 is provided around the centrifugal fan portion 88. In other words the outer face of the casing or housing 110 is of spiral conformation as best illustrated in Fig. 3 and is provided with a discharge connection 112 in the instance shown directed laterally from the heater so as to provide a connection for the duct 20 previously described and which leads to the windshield 14. The housing 110 is provided with an opening 114 in its forward face through which the extension 92 of the centrifugal fan 88 projects in close but freely spaced relation and the rear face of the housing 110 is sealed against the escape of air between it and the motor 80 by means of an annular gasket 116, preferably formed of rubber interposed between them. The housing 110 is mounted relative to the motor 80 and fan 88 by being suitably secured to the strap 76 preferably by screws such as 118. In the preferred form rubber sleeves such as 120 insulate the screws 188 from the straps 76 and the straps 76 from the housing 110, in order to insulate these members from one another against the transmission of audible sounds between them.

The heater assembly may be supported from the dash 12 by means of bolts 124 projecting through the base of the strap 76 and the dash 12 and provided with nuts 126 on the forward face of the dash 12. In order to increase the leg room an opening may be cut in the dash 12 large enough to permit the motor 80 and the corresponding portion of the strap 76 to be projected therethrough in which case the assembly is projected through the dash until the fan housing 110 contacts the forward face of the dash. It will be apparent from an inspection of Fig. 3, as well as Fig. 2, that where the motor 80 and corresponding portions of the strap 76 are projected through the dash in order to increase the leg room in the driver's compartment of the automobile, it will not require an excessively large opening to permit these parts to project through the dash, such opening in any case being materially smaller than the projected transverse area of the heater assembly as a whole and as would have been required in heaters as heretofore constructed. On the other hand, if desired, the assembly may be projected through the dash to a greater extent and even to a point where the housing 110 for the auxiliary fan 88 is projected into the engine compartment and yet not require an opening in the dash of a size commensurate with the projected transverse area of the heater assembly. As will be apparent this feature of the present invention is particularly important particularly where such heaters may be provided as part of standard equipment on an automobile.

In the operation of the structure so far described, assuming that a flow of heat exchange mediums is being circulated through the radiator 27, when the motor 80 is energized it will cause the centrifugal fan 88 and the blades 90 together with the remaining parts constituting the fan unit to rotate. The fan blades 94 in rotating will draw air in through the rear face of the casing 54 on each side of the strap 76, and which air will be forced forwardly through the core of the radiator 27 and in passing therethrough will be heated, and in being discharged therefrom will be directed by the doors 18 as desired. A portion of the air directed through the core will be deflected by the deflecting member 93 into the inlet end of the conduit formed by the member 91. At the same time the operation of the centrifugal fan 88 will cause a suction to be built up within the conduit 91 and will draw a portion of the air passed through the heater in the vicinity of the inlet end of the conduit, and the air directed into the conduit by the deflecting member rearwardly through the conduit, into the centrifugal fan 88. From there the air will be discharged under pressure to within the housing 110 and thence discharged through the connection 112 and ducts or tubes 21, 22 and 24.

It is not in all cases necessary that the conduit formed by the hollow member 91 extend entirely through the heating core to the front face thereof, and in Fig. 7 a modified structure is illustrated in which the portion of the hollow member 91 within the heating core is terminated at a point substantially mid-way through the core. In this structure the suction created within the member 91 by the centrifugal fan 88 creates a low pressure area immediately adjacent the inlet end of the member 91 causing a portion of the air passing through the core to be reversed in its direction of flow and drawn through the conduit 91.

Another modified structure is illustrated in Figs. 8 and 9 in which instead of having the member 91 fixed relative to the heating core, a member 97 which is substantially circular in cross section is fixedly secured to the fan unit for rotation therewith. The member 97 is fixed relative to the fan unit preferably immediately adjacent the inlet of the centrifugal fan 88 so that the air passing through the conduit formed by the member 97 is directed to the inlet of the centrifugal fan.

The substantially circular member 97 extends forwardly of the fan unit to a position within the heating core of the radiator. In order to receive the forward end of the member 97 within the core for rotation therein a substantially circular sleeve 98 is mounted within the core in concentric relation to the member 97. Another header member 99 which is annular in shape is fixed to the sleeve 98 in concentric relation thereto and provides the communicating passage for those tubes 30' which have portions removed in order to provide the space to receive the member 97. Thus the tubular elements 30' are of such a length as to provide the substantially circular space within the core, and those tubes on the opposite of the member 97 are in communication with each other through the circular header 99.

In the operation of the structure illustrated in

Figs. 8 and 9 the propeller fan 94 forces the air through the heating core to thereby heat the air and discharge the heated air through the forward face of the heater. The low pressure created within the channel formed by the member 97 by the centrifugal fan 88 creates a low pressure immediately adjacent the front face of the heating core substantially centrally of the core and thereby causes a portion of the heated air discharged outwardly through said core to be reversed in its direction of flow and flow rearwardly through the conduit 97 into and through the centrifugal fan 88 from which it is discharged in the manner described above.

Formal changes may be made in the specific embodiment of the invention described without departing from the spirit and substance of the broad invention the scope of which is commensurate with the appended claims.

What is claimed is:

1. In an automobile body heater, a heating core, means to force air through said core to thereby heat said air, means forming an air confining conduit through said core substantially centrally thereof, means for drawing heated air through said conduit, the construction and arrangement of said conduit relative to said core being such that a portion of said heated air is reversed in its flow and passes through said conduit.

2. In an automobile body heater, a heating core, means to force air through said core to thereby heat the air, means forming an air confining conduit through said core substantially centrally thereof, deflecting means mounted adjacent one end of said conduit for directing a portion of said heated air into said conduit, and means for drawing the heated air through said conduit.

3. In an automobile body heater, a core, means to force air through said core to thereby heat said air, means forming an air confining conduit through said core substantially centrally thereof, said last named means being fixed relative to said core, and means for drawing heated air through said conduit, the construction and arrangement of said conduit relative to said core being such that a portion of the air passed through said core is reversed in its flow and passes into and through said conduit.

4. In an automobile body heater, a heating core, means to force air through said core to thereby heat said air, means forming an air confining conduit through said core substantially centrally thereof, said conduit extending from a position adjacent the front face of said core rearwardly to a position beyond the rear face of said core, deflecting means mounted adjacent the front of said conduit and forwardly of said heating core for reversing the direction of flow of a portion of the heated air passed through said core and directing said portion of said heated air into said conduit, and means adjacent the rear of said conduit for drawing the heated air through said conduit.

5. In an automobile body heater, a heating core, said core having transversely extending heating elements, means to force air through said core to thereby heat said air, means forming an air confining conduit through said core substantially centrally thereof, that portion of said conduit within said core having substantially flat top and bottom walls, a deflector mounted adjacent the front of said conduit forwardly of said core for reversing the direction of a portion of the heated air passed through said core and directing it into said conduit, and means adjacent the rear of said conduit for drawing said heated air through said conduit.

6. In an automobile body heater, a heating core, a unitary propeller and centrigual fan member rotatably mounted to the rear of said core, means forming an air confining conduit through, said core substantially centrally thereof and substantially aligned with the axis of rotation of said unitary fan member, said last named means extending from a position adjacent the front face of said core rearwardly to a position adjacent the inlet of said centrifugal fan, deflecting means mounted adjacent the front end of said conduit and forwardly of said core, the construction and arrangement of said conduit, said fan unit, and said deflecting means relative to said core being such that air is forced through said core to thereby heat said air and a portion of said heated air is directed into said conduit and passes therethrough.

7. In an automobile body heater, a heating core, a unitary propeller and centrifugal fan member rotatably mounted behind said core, means forming an air confining conduit through said core substantially centrally thereof, said last named means being mounted to said unitary fan for rotation therewith in substantial alignment with the axis of rotation of said unitary fan, and said conduit extending from within said core rearwardly to a position adjacent the inlet of said centrifugal fan, the construction and arrangement of said unitary fan and said conduit relative to said heating core being such that air is forced through said heating core to thereby heat the air and a portion of the heated air is reversed in its direction of flow and passes through said conduit.

8. In an automobile body heater, a substantially vertical forwardly facing heating core, said heating core including oppositely disposed header members connected by transversely extending tubular elements, another substantially circular header member located at substantially the center of said core, said last named header member communicating with those tubular elements at substantially the center of said core, a unitary propeller and centrifugal fan member mounted to the rear of said core, means forming a substantially circular in cross section conduit fixedly secured relative to said unitary fan for rotation therewith, said means forming said conduit lying within said last named core, the construction and arrangement of said conduit and said fan unit relative to said core being such that air is forced through said core to be heated thereby and a portion of said heated air is reversed in its flow and passes through said conduit.

LAMBERT M. PAYNE.